(12) United States Patent
Miekka et al.

(10) Patent No.: US 6,967,417 B2
(45) Date of Patent: Nov. 22, 2005

(54) VARIABLE WINDING GENERATOR

(76) Inventors: Fred N. Miekka, 3210 Lombardy Rd., Pasadena, CA (US) 91107; Peter W. Mackie, 276 Grandview Ave., Sierra Madre, CA (US) 91024

( * ) Notice: Subject to any disclaimer, the term of this patent is extended or adjusted under 35 U.S.C. 154(b) by 0 days.

(21) Appl. No.: 10/353,798

(22) Filed: Jan. 29, 2003

(65) Prior Publication Data

US 2004/0145256 A1 Jul. 29, 2004

(51) Int. Cl.⁷ .................. H02K 11/00; H02K 21/00
(52) U.S. Cl. ............... 310/68 R; 310/68 B; 310/181; 322/90
(58) Field of Search .............. 322/28, 89–90; 310/156, 67 R, 68 R, 68 B, 181, 68 D, 198, 268, 68 E; 318/254, 439

(56) References Cited

U.S. PATENT DOCUMENTS

| | | | | |
|---|---|---|---|---|
| 338,320 A | * | 3/1886 | Van Depoele | 322/25 |
| 857,132 A | * | 6/1907 | Weszelinovits | 318/475 |
| 3,063,002 A | * | 11/1962 | Phelon | 322/90 |
| 3,809,995 A | * | 5/1974 | Hardin | 307/18 |
| 4,720,640 A | | 1/1988 | Anderson et al. | |
| 5,625,276 A | * | 4/1997 | Scott et al. | 322/24 |
| 5,696,419 A | | 12/1997 | Rakestraw et al. | |
| 5,788,007 A | * | 8/1998 | Miekka | 180/205 |
| 5,903,118 A | * | 5/1999 | Miekka et al. | 318/254 |
| 6,037,692 A | * | 3/2000 | Miekka et al. | 310/198 |

* cited by examiner

Primary Examiner—Burton Mullins
(74) Attorney, Agent, or Firm—Eric K. Satermo

(57) ABSTRACT

An electric generator is disclosed having a high efficiency over wide ranges in rotor speed and power output requirements. Output voltage control is achieved by providing the power output windings with variable adjustment. This variable adjustment determines the number of turns that are used for the power output on the power output windings themselves. When excess voltage is generated, turns used on the power output windings are reduced thereby reducing output voltage and increasing efficiency by lowering the power output winding resistance. When the voltage generated is low, more turns on the power output windings are activated thereby increasing the voltage of the generator itself. This voltage control occurs prior to any voltage modification outside of the generator. A sensor and feedback mechanism is used to automatically adjust the power output windings thereby attaining maximum efficiency at the desired voltage and power level.

15 Claims, 5 Drawing Sheets

VARIABLE WINDING GENERATOR

BACKGROUND OF THE INVENTION

1. Field of the Invention

This invention relates to electric generators and more particularly relates to generators and alternators operating at high efficiency which are suitable for use under a variety of changing conditions.

2. Description of Related Art

There are numerous generators used throughout the world for generating electric power. Such generators use the basic principal of electromagnetic induction to convert the energy of motion into electricity. If an electrical conductor such as a wire is moved through a magnetic field, or conversely if a magnetic field is made to change in the presence of such a conductor, an EMF or voltage will be induced in the conductor. The voltage induced in the conductor is determined by the following factors:

(1) If the conductor is a wire in the form of a coil the greater the number of turns in the coil, the greater will be the induced EMF.

(2) The faster the conductor moves through the magnetic field the greater will be the induced EMF.

(3) The stronger the interacting magnetic field is the greater will be the induced EMF. If the conductor is stationary but the magnetic field changes (such as the case with permanent magnet alternators) the faster the rate of change the greater will be the induced EMF.

When power is required such as for lighting applications, a connection is made between the producing conductor of the generator and to the device. This causes a current to flow from the generator to the device. Whenever a generator delivers power to some device an associated mechanical drag on the moving parts of the generator results. The more power that is pulled from a generator, the greater will be the mechanical requirements needed to keep the generator producing power. Many generators such as the ones powered by gasoline engines used in portable applications are designed to run at a fixed speed under the conditions of a given load. Such generators work well because the source of mechanical power (the gasoline engine) can be controlled and soon reaches a steady state for any given load. In many cases, this is quite suitable.

There are many generators that are designed to produce power under varying conditions of speed and required power output. A good example of this type of generator is the alternator used to power the electrical systems in automobiles. The power output of such alternators must be carefully controlled to maintain proper battery life. If not enough power is supplied to the battery and the associated electrical needs of the car, the battery will run down. If too much power is delivered to the battery, the battery will overcharge resulting in reduced battery life, and possibly over voltages which can damage certain electrical components in the electrical system of the automobile. In addition to the changing needs of the automobiles electrical system, the speed of the engine is always changing. Sometimes the engine is slowly idling at a few hundred RPM. Other times, the engine is running at several thousand RPM. Because of this, alternators used for the generation of power in automobiles have electrical circuitry which regulates the output power of the alternator to the needs of the electrical system. This is accomplished by employing two sets of electromagnets. One set is located into the rotary portion of the alternator or rotor, and the other set of electromagnets is located in the stationary portion of the alternator or stator. The rotor electromagnets require electrical power to produce the initial magnetic field. This power comes from a set of brushes that supply electricity to the commutator of the rotor to deliver power to their windings while at the same time allowing the rotor to rotate. The rotor electromagnet consists of many turns of a light gauge wire such as #21. Because of this, not much current will flow into this electromagnet. This results in a low power demand on the brushes. The stator electromagnet consists of a few turns of heavy gauge wire such as #14. The stator windings produce a substantial amount of AC current due to the changing magnetic field caused by the rotating rotor electromagnet. This AC current is then rectified to DC using diodes. Voltage regulation circuitry is used to control power going into the rotor electromagnet. In this way, a small amount of control current in the rotor results in a very large change in output current and voltage from the stator windings. This configuration works well for electric generators and alternators employing rotating electromagnet windings because a fine control in voltage output is easily attained under constant or variable speed conditions.

Numerous alternators have been built employing permanent magnets in the rotor, and electromagnets in the stator. These alternators can be used to generate AC power, or alternatively can have their power rectified with diodes to produce DC power. Such alternators are inherently more reliable because of their brushless design. They also have fewer moving parts to wear out and do not require input power to provide output power. These brushless permanent magnet alternators also produce less heat owing to the fact that there are no rotor windings. Such alternators have been employed in motorcycles and other lightweight vehicles. For example, The Ducati SL500 Pantah alternator is used in many Ducati motorcycles. This particular alternator is a permanent magnet alternator employing a rotor having permanent magnets surrounded by a stator electromagnet assembly. This permanent magnet alternator is designed to be used with a specific regulator, the SL500 Pantah regulator which rectifies the AC power from the alternator as well as regulating the output power. Many motorcycles utilize an external rotor which doubles as the flywheel. As usual, voltage regulation is carried out using electrical circuitry which is placed between the output from the alternator and the battery. Such an approach while being rather simple, cost effective, and straightforward has its drawbacks. The alternator output voltage to the regulating circuitry is dependent on rotor speed. Because of this the power output from such alternators is rarely occurring under optimum conditions of efficiency. When operating at low RPM values such permanent magnet alternators must have enough windings to provide sufficient voltage for the electrical system. Such windings often have relatively high electrical resistance owing to the need to use small gauge wire to fit many turns of wire on the stator electromagnet. Conversely, in order to deliver substantial current at high RPM conditions without excessive voltage, the wire diameter needs to be of a relatively large gauge with only few turns needed. In practice a compromise in performance on either end of the RPM scale is reached by choosing an intermediate gauge wire diameter having a substantial number of turns. Such systems have a difficult time delivering the needed power under the wide ranges of RPM values normally experienced during use. Despite these drawbacks existing electrical systems employing permanent magnet alternators have a proven record of reliability for use in motorcycles and other lightweight vehicles. Further improvements in efficiency and reliability of systems employing these permanent magnet alternators can be expected by the use of improved power control circuitry.

In addition to alternators for vehicle use permanent magnet alternators are being increasingly employed in generators used in standby power applications as well as generators used in alternative energy systems utilizing forms of power such as wind and hydroelectric. One example of such a system is outlined in U.S. Pat. No. 4,720,640. In this patent, a turbine is driven by a fluid such as moving air or moving water. On the periphery of this turbine are located permanent magnets. A stator consisting of multiple electromagnets is located around the outside periphery of the rotor permanent magnets with the electromagnet pole faces located in close coupling proximity to the pole faces of the rotor permanent magnets. A similar system is outlined in U.S. Pat. No. 5,696,419 to Rakestraw. As in U.S. Pat. No. 4,720,640, a fluid driven impeller having a periphery of permanent magnets is employed as the rotor. The stator electromagnets are C-Shaped and straddle the permanent magnet pole faces in the rotor. One advantage this system offers for some applications is a power curve that tends to be self-limiting under the conditions of high RPM. Despite these and other numerous advances in generators and alternators there is a need for an alternator or a generator having variable power output windings employing electrical circuitry which will automatically vary the number of these windings based on running RPM and needed power demands. In this way the power output of the generator itself can compensate for changes in RPM and load requirements with minimal or no voltage regulation circuitry required.

Power generating windmills are a prime example. Wind speeds are always changing, however, the output voltage during power delivery needs to be relatively constant. In low wind conditions the ideal power generating electromagnet windings are preferably large in number to generate the needed voltage to power these energy systems. In addition the generator rotor drag caused by the output power has to be somewhat limited to prevent the stalling of the generator. Because of this many turns of a relatively small gauge electromagnet wire would be desired. During high wind conditions a few turns of a relatively heavy gauge wire would be the desire. In this way enough current at a suitable voltage can be delivered to make use of the power available under high wind conditions, not overheat from too high a winding resistance, and be able to create enough mechanical drag to keep the windmill impeller from spinning too fast and flying apart.

Other examples include alternators for use in vehicles such as automobiles, motorcycles, trucks, and the generation of electric power from variable speed sources and/or for variable power requirements.

In view of the foregoing, it is an object of this invention to provide an electric generator or alternator which eliminates the need for armature brushes.

It is a further object of this invention to provide a generator or alternator having a high efficiency under the conditions of changing rotor speed.

It is a further object of this invention to provide a generator or alternator having variable output voltage characteristics.

Finally, it is an object of this invention to reduce the requirements of power control circuitry normally used to modify generator output voltage into a useable form.

SUMMARY OF THE INVENTION

This invention therefore proposes a permanent magnet generator or alternator having one or more variable power output windings along with electrical circuitry for automatically and continuously varying the number of activated turns on power output windings based on power demands, rotor speed, or both. Variable turn windings are employed in the output power stator electromagnet assembly. Multiple triacs or other switching circuitry may be used to activate individual turns on the power output windings. Finally, a sensor is used to determine the appropriate time to activate windings. If RPM sensing is important and a permanent magnet alternator is the desired generator the output voltage of the generator itself can be used as a signal source for changeover. Alternatively a small coil can be placed in the proximity of the rotor magnets to provide a voltage signal which is proportional to RPM as well. If the signal has substantial power such as would be the case of using the generator output voltage itself as the signal a relay may be wired directly to the signal source. If the signal is low in power then semi-conductor amplification circuitry may be used. In either case some circuitry is needed for signal generation and/or variable power output winding activation.

DESCRIPTION OF THE INVENTION

Figure 1:
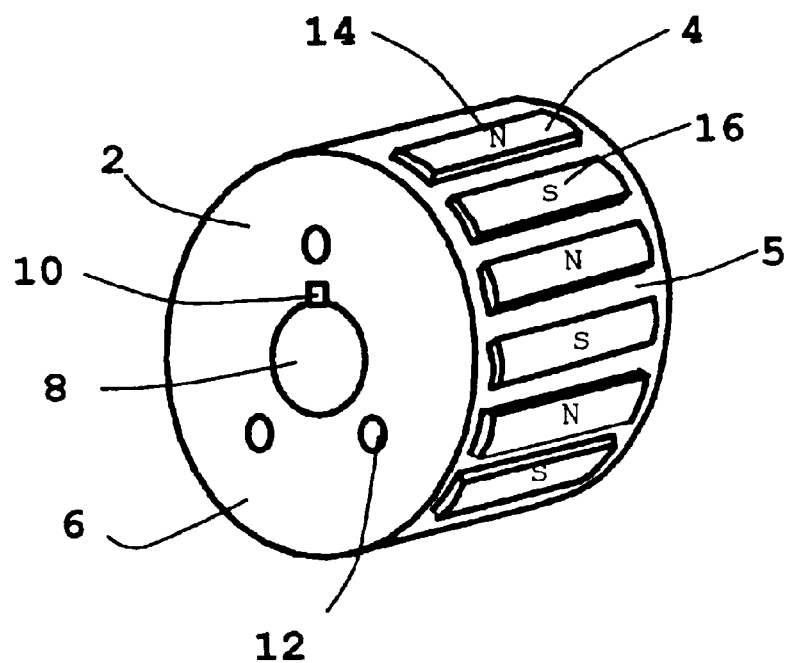
FIG. 1 shows the rotary portion of a traditional permanent magnet alternator employed in Ducati motorcycles, which is also suitable for use in this invention.

FIG. 1 shows the rotary portion of a traditional permanent magnet alternator employed in Ducati motorcycles. This type of rotor having permanent magnets attached is typical of the permanent magnet alternators employed in motorcycles.

Rotary portion 2 consists of steel drum portion 6 having permanent magnets 4 mounted along outside edge portion 5. Front face portion 6 has mounting means consisting of central hole 8 along with a notch 10 for a keyway. Fastening holes 12 are used to properly secure rotary portion 2 to rotating parts on the motorcycle. Also shown are pole faces 14, and 16 of permanent magnets 4 which alternate with each permanent magnet around outside edge portion 5 of rotary portion 2.

Figure 2:
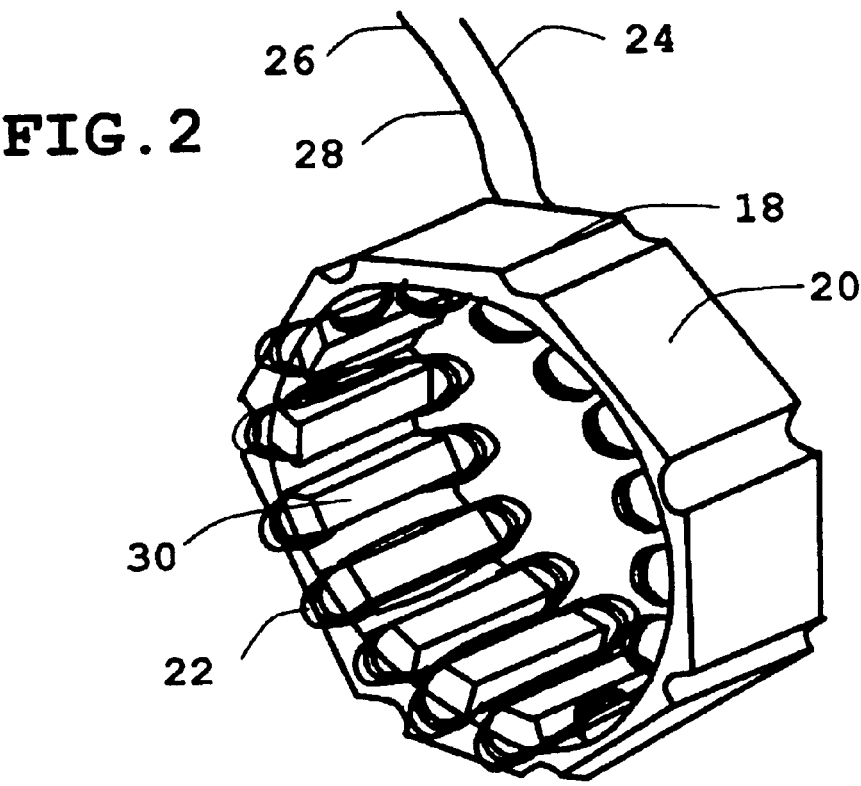
FIG. 2 shows the electromagnet stator portion of a traditional permanent magnet alternator employed in Ducati motorcycles.

This rotary portion creates a changing magnetic field when rotated within the stationary electromagnet portion of FIG. 2. It should be noted that the faster rotary portion 2 of FIG. 1 spins, the greater will be both the output voltage and output frequency of AC power produced in the stationary electromagnet portion of FIG. 2.

FIG. 2 shows the electromagnet stator portion 18 of the traditional permanent magnet alternator utilizing rotary portion 2 of FIG. 1 (not shown). Electromagnet core 20 is formed of ferromagnetic material in the traditional fashion. Electromagnet windings 22 are comprised of electromagnet wire 28 wrapped around electromagnet core pole faces End portions 24, and 26 of electromagnet windings 22 provide power output.

Figure 3:
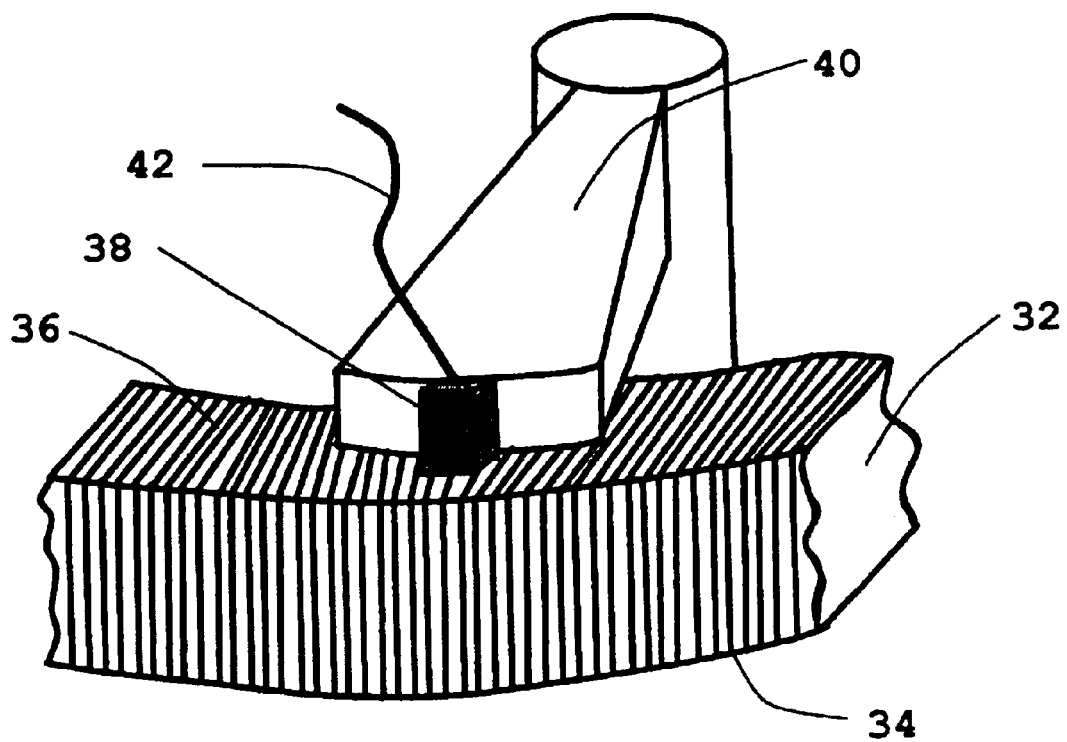
FIG. 3 shows a core cross section of the sliding brush portion of a variac (variable autotransformer) used to vary the output voltage.

FIG. 3 Shows a core cross section along with the sliding brush portion of a variac (variable autotransformer) used to vary output voltage from an AC source. Electromagnet core 32 is in the shape of an iron ring. Electromagnet windings 34 are tightly wrapped around electromagnet core 32 forming a toroid. Upper surface portion 36 of electromagnet windings 34 are free from electrical insulation and therefore are suitable for making electrical contact. Sliding brush 38 is made to contact upper surface portion 36 of electromagnet windings 34 by way of downward force exerted from brush holder 40. Also shown is pigtail 42 which provides electrical output from sliding brush 38.

A variac (variable output autotransformer) provides variable voltage output by changing the number of turns that are activated on the output side. This is accomplished by way of the sliding brush contact arrangement to the individual windings themselves. The result is a fairly concise adjustable voltage output which is substantially continuous. It should be noted however that the voltage output is not completely continuous owing to the fact that as each individual winding is activated there is a discrete voltage jump of a fraction of a volt. The number of windings is such that for all intensive purposes the output is substantially continuously variable in nature.

Figure 4:
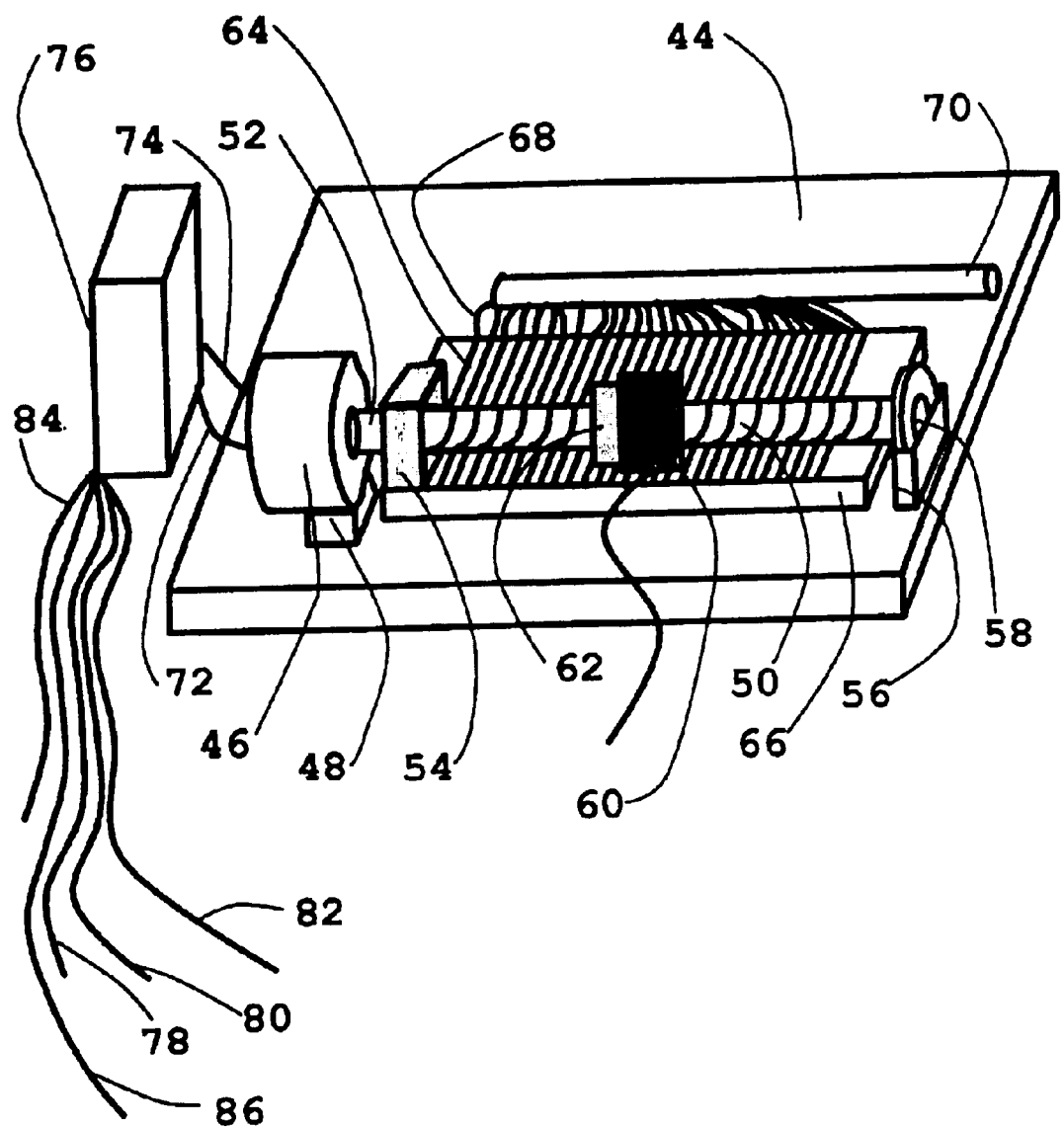
FIG. 4 shows variable output electromagnet contacts utilizing a sliding brush assembly which employs a small electric motor for automatic output voltage adjustment.

FIG. 4 shows variable output electromagnet contacts utilizing a sliding brush assembly which employs a small electric motor for automatic output voltage adjustment. Base plate 44 is used to mount small electric motor 46 into place using motor mount 48. Small electric motor 46 is reversible thus allowing the shaft to spin clockwise or counter clockwise. Permanent magnet DC electric motors are suitable for this purpose and are available in a variety of sizes. Helical threaded portion 50 is attached to motor shaft 52 using shaft coupler 54. Also shown is bearing mount 56 which secures bearing 58 to base plate 44. Bearing 58 provides support for helical threaded portion 50 while at the same time allowing rotation in either direction. Also shown is brush 60 which is fastened to helical threaded portion 50 by way of threaded nut 62 such that when threaded portion 50 rotates, brush 60 moves in a straight line along threaded portion 50. Contact plate 64 consists of insulated plate 66 along with wire contacts 68. Wire contacts 68 represent the individual ends of electromagnet windings from the electromagnet portion of a permanent magnet alternator (not shown). Wire bundle 70 carries wires to the individual electromagnet windings of the variable output generator or alternator of this invention. Also shown are input motor leads 72, and 74 which supply power when needed to small electric motor 46. Attached to motor leads 72, and 74 is relay switching box 76 which activates small electric motor 46 when needed. DC power is supplied to relay box 76 by way of power input leads 78, 80, and 82. Also shown are generator output voltage sensor leads 84, and 86 which sense the output voltage of the generator (not shown).

When the output voltage of the generator (not shown) falls below the desired voltage, one of the voltage sensing relays in box 76 is activated, power is applied to small electric motor 46 causing threaded shaft portion to rotate. Brush 60 then slides along wire contacts 68 thereby increasing the number of turns activated in the output of the electromagnet portion of the generator or alternator of this invention thereby maintaining the desired output voltage. Conversely, when the output voltage of the generator or alternator of this invention is in excess, one of the voltage sensing relays in box 76 is activated, power is applied to small electric motor 46 causing threaded shaft portion to rotate. Brush 60 then slides along wire contacts 68 thereby decreasing the number of turns activated in the output of the electromagnet portion of the generator or alternator of this invention thereby maintaining the desired output voltage.

There are several advantages to be realized from modifying the number of turns in the output electromagnet windings of a permanent magnet alternator or generator. When the rate of rotation increases in the rotating portions of these devices the voltage output increases. Reducing the output voltage by limiting the number of turns that are activated on the electromagnet windings themselves provides voltage control along with the added bonus of reduced electromagnet winding resistance. This aspect is advantageous owing to the fact that winding resistance in generators is source of efficiency losses. Reducing this winding resistance therefore results in a direct increase in the overall efficiency of the operating device.

In addition, inductive reactance effects will start to limit output power as the power output frequency increases with rotation speed. The effects of inductive reactance are based on frequency and inductance. The greater the frequency, the greater will be the inductive reactance to any given coil such as the electromagnet portion of a permanent magnet alternator. The greater the number of turns on an inductor, the greater will be the inductive reactance on any given inductor. Added benefits may be realized by modifying the number of turns used in the electromagnet portion of a permanent magnet alternator.

Figure 5:
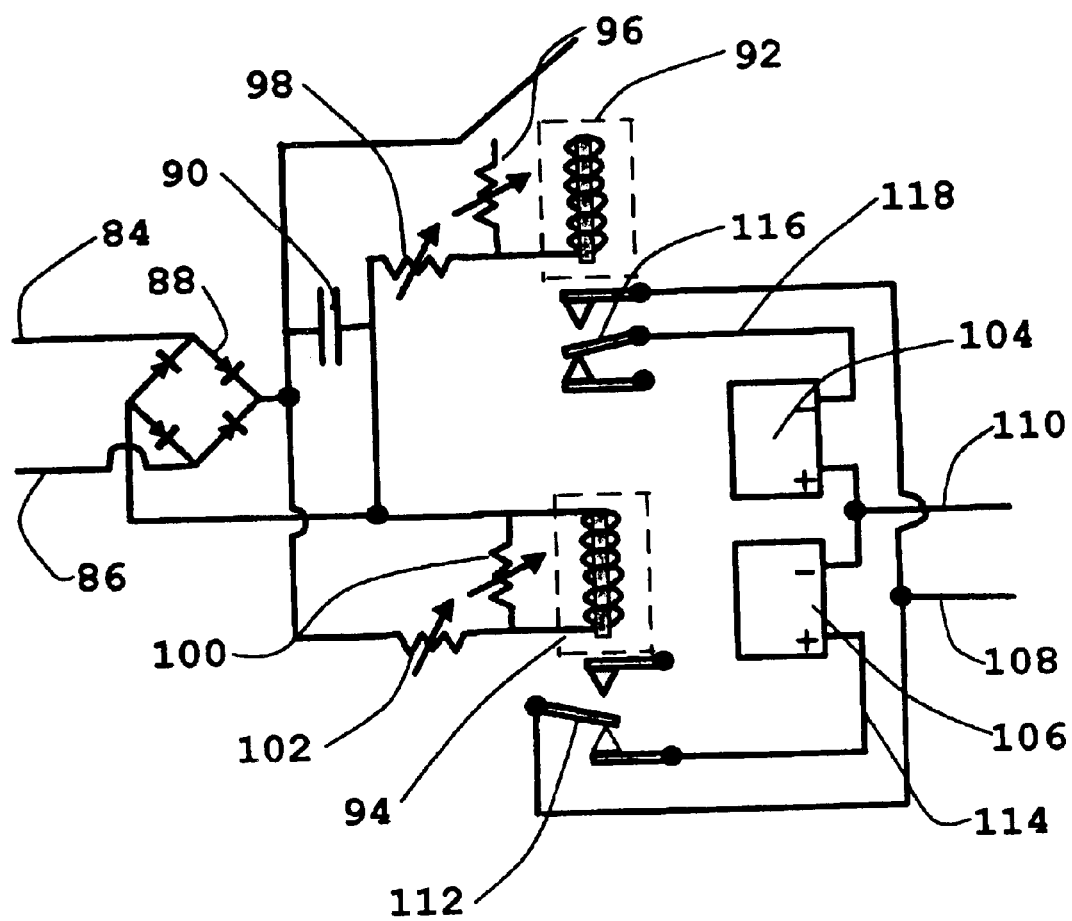
FIG. 5 shows circuitry for sensing output voltage from a generator utilizing two relays.

FIG. 5 shows circuitry located in relay box 76 of FIG. 4 which is used for sensing output voltage from a generator utilizing two relays. Leads 84, and 86 come in from the generator or alternator and are converted to DC voltage by full wave bridge rectifier Capacitor 90 smoothes out the voltage making it suitable for activation of relays 92, and 94. Variable resistors 96, and 98 are adjustable and thus controls the activation point for relay 92. Likewise, variable resistors 100, and 102 control the activation point for relay 94. DC voltage power supplies 104, and 106 are activated by relays 92, and 94 in such a way as to have the voltage output of the power supplies reversible with respect to output leads 108, and 110. Relay 94 is activated when the incoming voltage supplied by leads 84, and 86 falls below the desired value. Contactor 112 of relay 94 connects lead 114 of power supply 106 thereby providing positive voltage to output lead 108, and negative voltage to output lead 110. Relay 92 is activated when the incoming voltage supplied by leads 84, and 86 rises above the desired value. Contactor 116 of relay 92 connects lead 118 of power supply 104 thereby providing negative voltage to output lead 108, and positive voltage to output lead 110.

Figure 6:
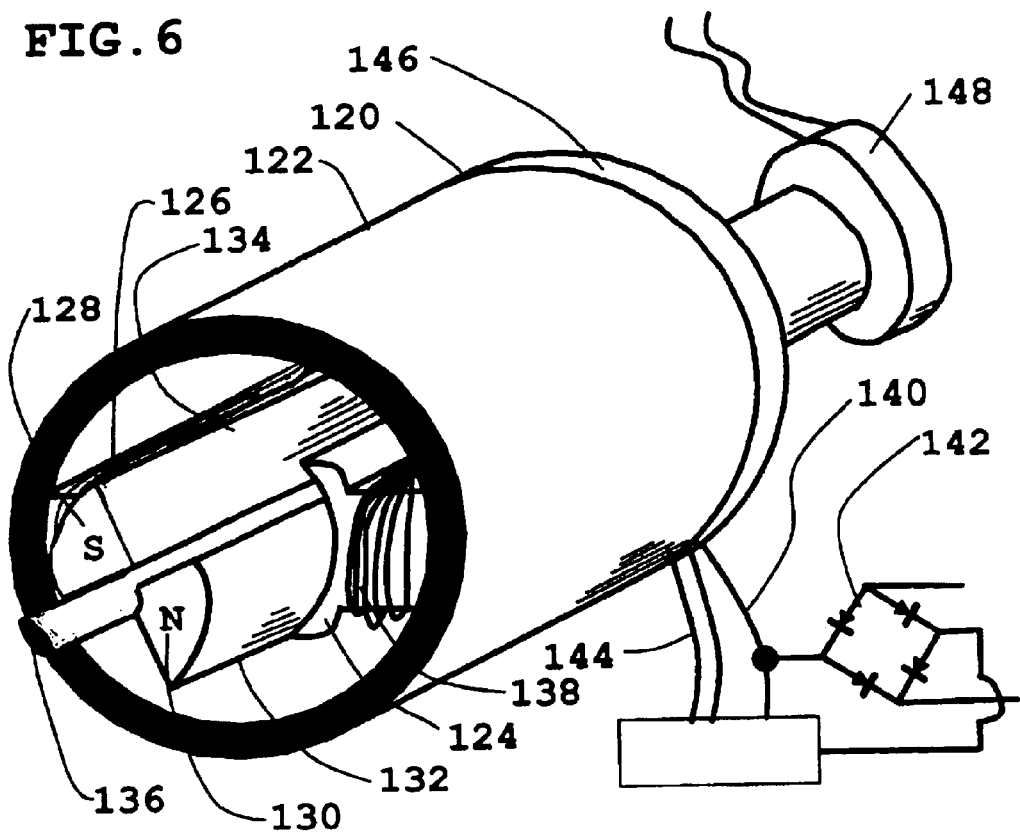
FIG. 6 shows a permanent magnet alternator having a rotor of permanent magnets and electromagnets having multiple contactors.

FIG. 6 shows a permanent magnet alternator having a rotor of permanent magnets and electromagnets having multiple contactors suitable for the variable output aspects of this invention. Variable output permanent magnet alternator 120 is shown having outer generator casing 122 enclosing electromagnets 124, and 126. Also shown are permanent magnets 128, and 130 having pole faces 132, and 134 facing outward in a radial direction. These pole faces are of alternate polarity Pole face 132 is a north pole, and pole face 134 is a south pole. When more permanent magnet pole faces are employed it is to be understood that they alternate with each successive pole face all of the way around. Permanent magnets 128, and 130 are attached to generator shaft 136. Electromagnet windings 138 provide power output from brushless permanent magnet alternator 120. Lead 140 is the common lead and is shown directly connected to full wave bridge rectifier 142. Full wave bridge rectifier 142 consists of four diodes arranged together in the bridge as shown. Multiple output leads from individual windings 138 are shown as wire bundle 144. Common output lead 140 and multiple output wire bundle 144 are wired to variable output electromagnet circuitry 214 shown in detail in FIG. 4. Also shown is endcap 146 which provides support for permanent magnet brushless shaft Small electric generator 148 is also shown. Small generator 148 is suitable for sensing alternator RPM and may be employed in controlling the activation of variable electromagnet windings 138.

Figure 7:
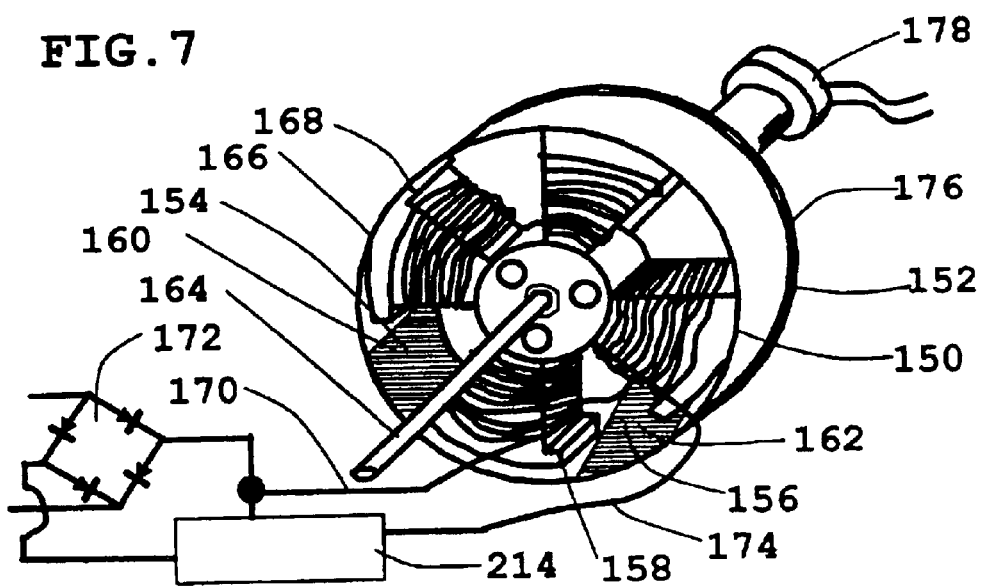
FIG. 7 shows a permanent magnet alternator having an outer rotor of permanent magnets and an inner stator electromagnet portion having multiple contactors suitable for the variable output aspects of this invention.

FIG. 7 shows a permanent magnet alternator having an outer rotor of permanent magnets and an inner stator electromagnet portion having multiple contactors suitable for the variable output aspects of this invention. Variable output permanent magnet alternator 150 is shown having outer alternator casing 152 enclosing permanent magnets 154, and 156. Permanent magnets 154 and 156 are attached to inside surface portion 158 of outer alternator casing 152. Furthermore pole faces 160 and 162 of permanent magnets 154 and 156 face radially inward and alternate with each successive permanent magnet all of the way around. Electromagnets 166 are attached to generator shaft 164. Electromagnet windings 168 provide power output from brushless permanent magnet alternator 150. Lead 170 is the common lead and is shown directly connected to full wave bridge rectifier 172. Full wave bridge rectifier 172 consists of four diodes arranged together in the bridge as shown. Multiple output leads from individual electromagnet windings are shown as wire bundle 174. Common output lead 170 and multiple output wire bundle 174 are wired to variable output electromagnet circuitry 214 shown in detail in FIG. 4. Also shown is end cap 176 which provides support for permanent magnet brushless alternator shaft 164. Small electric generator 178 is suitable for sensing the RPM of the alternator and may be employed in controlling the activation of variable electromagnet windings 168.

Figure 8:
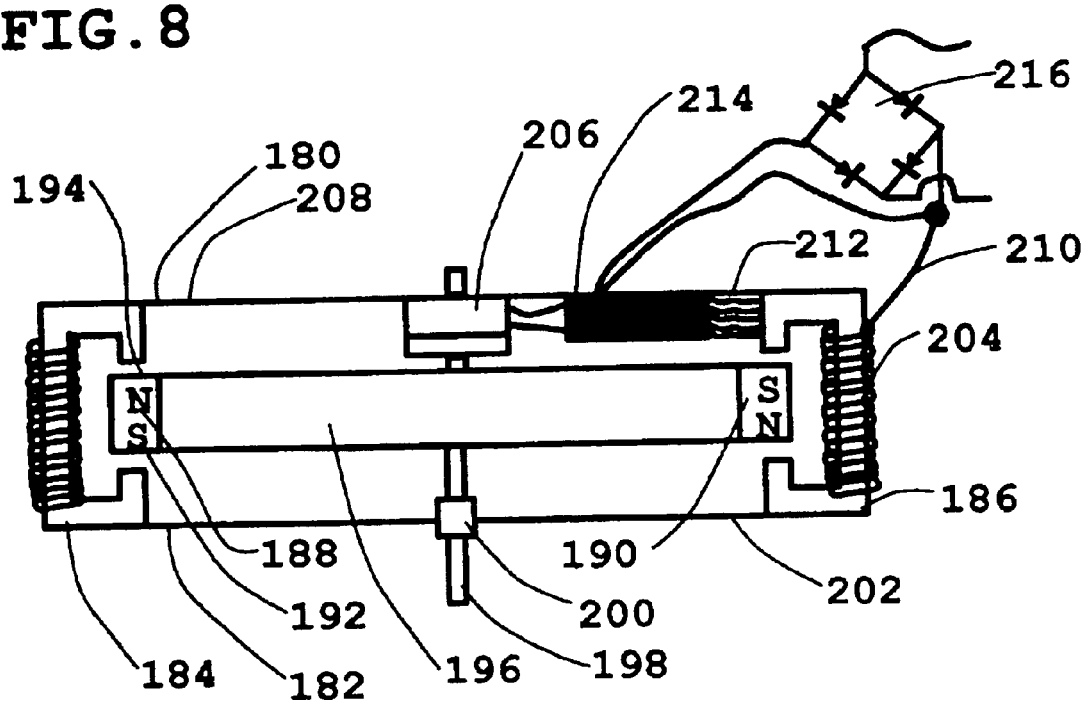
FIG. 8 shows a permanent magnet alternator having a disc rotor with permanent magnets and a stator having an electromagnet portion having multiple contactors equipped for controlling uniform output voltage.

FIG. 8 shows a permanent magnet alternator having a disc rotor with permanent magnets and a stator having an electromagnet portion having multiple contactors equipped for controlling uniform output voltage. Variable output permanent magnet alternator 180 is shown having outer alternator casing 182 enclosing electromagnets 184, and 186. Also shown are permanent magnets 188, and 190 having pole faces 192 and 194 on top and bottom surfaces so that the direction of magnetization is transverse through rotary disc portion 196. When more permanent magnet pole faces are employed it is to be understood that they alternate with each successive pole face all of the way around the disc. Rotary disc portion 196 is attached to shaft 198. Front shaft bearing 200 rotatably attaches shaft 198 to front end portion 202 of alternator casing 182. Electromagnet windings 204 are also shown. Electromagnet windings 204 provide power output from brushless permanent magnet alternator 180. Also shown is small electric generator 206. Small electric generator 206 is capable of producing a voltage output signal that is proportional to speed and therefore may be employed in controlling the activation of variable electromagnet windings 204. Generator 206 is securely fastened to back end portion 208 of outer alternator casing 182. Variable electromagnet windings 204 have a common output lead 210 and a multiple output wire bundle 212. Common output lead 210 and multiple output wire bundle 212 are wired to variable output electromagnet circuitry 214 shown in detail in FIG. 4. Also shown is full wave bridge rectifier 216 which rectifies the output current from permanent magnet alternator 180. Full wave bridge rectifier 216 consists of four diodes arranged together in the bridge as shown.

Those skilled in the art will understand that the embodiments of the present invention described above exemplify the present invention and do not limit the scope of the invention to these specifically illustrated and described embodiments. The scope of the invention is determined by the terms of the appended claims and their legal equivalents, rather than the described examples. In addition, the exemplary embodiments provide a foundation from which numerous alternatives and modifications may be made, which alternatives and modifications are also within the scope of the present invention defined by the appended claims.

What is claimed is:

1. A permanent magnet alternator comprising:
    a rotatable portion including:
        a shaft; and
        a plurality of permanent magnets each attached to said shaft and having a direction of magnetization and poles;
        said poles of said permanent magnets facing outward in a radial direction and alternating with each successive of said permanent magnets;
    a stationary portion including:
        a housing for rotatably supporting said shaft and having an inner surface; and
        at least one electromagnet having poles, and including at least one winding;
        said winding of said at least one of said electromagnets having a number of output turns sufficient for substantially continuous variable output;
    sensing means for sensing power output, rotor RPM, or both; and
    electrical switching means for varying the number of turns of at least one of said electromagnet windings thereby modifying power generation of said permanent magnet alternator;
    wherein said electrical switching means for varying the number of turns of said electromagnet is a relay activated motorized sliding brush contact.

2. An alternator as claimed in claim 1 further comprising rectification circuitry for providing a DC output.

3. An alternator as claimed in claim 2 wherein said rectification circuitry includes diodes.

4. An alternator as claimed in claim 1 wherein said sensing means is the output voltage of said alternator.

5. An alternator as claimed in claim 1 wherein said sensing means includes a separate power output generator used to produce a voltage signal which is proportional to speed.

6. A permanent magnet alternator suitable for the generation of electric power, said alternator comprising:
    a stationary portion including at least one electromagnet having at least one winding;
    a rotatable portion including:
        a shaft rotatable with respect to said stationary portion;
        a housing fixedly attached to one end of said shaft and circumscribing said shaft, said housing having an inner surface and an outer surface; and a plurality of permanent magnets each attached to said inner portion of said housing and having a pole, said poles of said permanent magnets facing inward in a radial direction and alternating with each successive of said permanent magnets and so that the poles are aligned in coupling proximity to the poles of said electromagnets;

said winding of said at least one of said electromagnets having a number of output turns sufficient for substantially continuous variable output;

sensing means for sensing power output, rotor RPM, or both; and electrical switching means for varying the number of turn of at least one of said electromagnet windings thereby modifying power generation of said permanent magnet alternator;

wherein said electrical switching means for varying the number of turns of said electromagnet is a relay activated motorized sliding brush contact.

7. An alternator as claimed in claim 6 further comprising rectification circuitry for providing a DC output.

8. An alternator as claimed in claim 7 wherein said rectification circuitry includes diodes.

9. An alternator as claimed in claim 6 wherein said sensing means is the output voltage of said alternator.

10. An alternator as claimed in claim 6 wherein said sensing means includes a separate power output generator used to produce a voltage signal which is proportional to speed.

11. A permanent magnet alternator suitable for the generation of electric power, said alternator comprising:

a stationary portion including at least one electromagnet having at least one winding;

a rotatable portion including;

a shaft rotatable with respect to said stationary portion;

at least one disc mounted to said shaft, said disc having a radial plane including an annular portion rotatably disposed within said stationary portion; and a plurality of permanent magnets each having a direction of magnetization and poles, said plurality of permanent magnets being disposed on said annular portion of said disc so that the direction of magnetization thereof is transverse through said disc and so that the poles thereof are aligned in coupling proximity to the poles of said at least one electromagnet;

said winding of said at least one of said electromagnets having a number of output turns sufficient for substantially continuous variable output;

sensing means for power output, rotor RPM, or both;

electrical switching means for varying the number of turns of at least one of said electromagnet windings thereby modifying power generation of said permanent magnet alternator; and rectification circuitry for providing a DC output;

wherein said electrical switching means for varying the number of a of said electromagnet is a relay activated motorized sliding brush contact.

12. An alternator as claimed in claim 11 further comprising rectification circuitry for providing a DC output.

13. An alternator as claimed in claim 12 wherein said rectification circuitry includes diodes.

14. An alternator as claimed in claim 11 wherein said sensing means is the output voltage of said alternator.

15. An alternator as claimed in claim 11 wherein said sensing means includes a separate power output generator used to produce a voltage signal which is proportional to speed.

* * * * *